F. R. ALLEN
STAMP APPLYING AND ENVELOP SEALING MACHINE.
APPLICATION FILED JUNE 26, 1909

1,110,097.

Patented Sept. 8, 1914.

WITNESSES
Willard W. Bardsley
E. I. Ogden

INVENTOR
Fred R. Allen.
BY Howard E. Barlow
ATTORNEY

F. R. ALLEN.
STAMP APPLYING AND ENVELOP SEALING MACHINE.
APPLICATION FILED JUNE 26, 1909.

1,110,097.

Patented Sept. 8, 1914.

WITNESSES
Willard A. Bardsley.
E. J. Ogden.

INVENTOR
Fred R. Allen.

BY Howard E. Barlow
ATTORNEY

F. R. ALLEN.
STAMP APPLYING AND ENVELOP SEALING MACHINE.
APPLICATION FILED JUNE 26, 1909.

1,110,097.

Patented Sept. 8, 1914.

WITNESSES
Willard W. Bardsley
E. D. Ogden

INVENTOR
Fred R. Allen.
BY Howard E. Barlow
ATTORNEY

UNITED STATES PATENT OFFICE.

FRED R. ALLEN, OF PROVIDENCE, RHODE ISLAND, ASSIGNOR, BY MESNE ASSIGNMENTS, TO NATIONAL ENVELOPE SEALING AND STAMPING MANUFACTURING COMPANY, A CORPORATION OF MASSACHUSETTS.

STAMP-APPLYING AND ENVELOP-SEALING MACHINE.

1,110,097. Specification of Letters Patent. Patented Sept. 8, 1914.

Application filed June 26, 1909. Serial No. 504,521.

*To all whom it may concern:*

Be it known that I, FRED R. ALLEN, a citizen of the United States, residing at the city of Providence, in the county of Providence and State of Rhode Island, have invented certain new and useful Improvements in Stamp-Applying and Envelop-Sealing Machines, of which the following is a specification, reference being had therein to the accompanying drawing.

This invention relates to a stamp applying and envelop sealing machine, and has for its object to provide a machine of this character that is simple and practical in construction, that may be operated rapidly and effectively to moisten the gummed surface of the flap and seal the envelop, also to moisten the surface of the envelop and apply the stamp thereto.

A further object of my invention is to provide means whereby the envelop is fed to the machine by hand to a locating or positioning stop, then by a further movement of the hand over the envelop the stamp applying mechanism is released and caused to be operated, the envelop then receives a further forward movement by hand into the conveying rolls by which latter the envelop is carried through the machine, closed and sealed, and then deposited in a stacker or other convenient receptacle.

A feature of my invention is my improved method of moistening the gummed surface of the envelop flap which is done by providing a vertically arranged flat-faced moistening disk running in a reservoir of water. In feeding the envelop the flap is arranged to hang down over the edge of the table and when advanced by a slight pressure of the hand, the gummed surface comes in contact with the face of this moistening disk, against which it is pressed with the desired tension by a presser roll.

Another feature of my invention is that the stamp feeding mechanism is positively operated and means are provided whereby it is impossible for this mechanism to feed the length of but a single stamp each time it is actuated.

The machine is so constructed that it may be readily arranged to be used as a stamp applying machine alone, as a sealing machine alone, or for both sealing and stamping the envelop when desired. The arrangement of the mechanism is such that mail matter of unlimited size, including legal envelops, large catalogues, calenders, or other heavy matter containing a closing flap, may be sealed and stamped by being passed through the machine.

With these and other objects in view, the invention consists of certain novel features of construction, as will be more fully described and particularly pointed out in the appended claims.

In the accompanying drawings.

Referring to the drawings, 1 designates the hollow rectangular frame or bed on which is mounted the sealing and conveying mechanism, and to which is also attached the stamp applying mechanism hereinafter described. On the back side near the entering end of this frame is located the flap moistening mechanism, the same comprising a disk 2 which may have a plain metal face, if desired, or a soft or flexible outer face 3 of absorbent material, preferably felt, said disk being held to rotate in an opening 4 through the side wall of said frame, with its face practically flush with the outer face of said wall. This disk is fixed on the end of the horizontal transversely arranged shaft 5 mounted in the bearings 6 and 7 in the sealer frame, the lower edge of said disk extending down into the water reservoir 5$^a$ by which the felt face is moistened, and said disk is driven at a slow speed preferably in the direction of the arrow or against the feed of the envelop, from the driving belt 8, through the pulley 9, shaft 10, miter gears 11, shaft 12, worm 13 and worm gear 14. Shaft 10 is also squared at 15 to receive a handle so that the machine may be manually operated when desired.

A shelf 16 set on a slight incline, is secured to the entering end of the sealer frame for supporting a pile of envelops to be fed to the machine.

Figure 5:
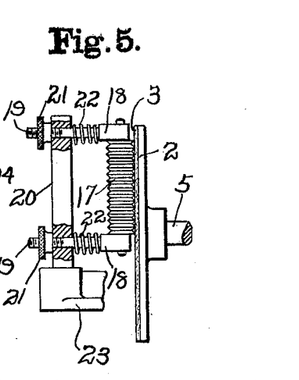
Fig. 5 is a detail illustrating the tension roll and mechanism for pressing the flap against the face of the moistening disk.

In order to press the flap of the envelop against the flexible moistened surface of the disk I have provided a vertically arranged corrugated presser roll 17, preferably made of metal, the corrugations being made to prevent moisture which may be deposited upon the roll from spreading over the outer face of the flap. Said roll is mounted in bearings 18, see Fig. 5, the stems 19 of which extend back through the standard 20. Springs 22 are wound around these stems to press said roll forward toward the surface of said disk and to allow the roll to adjust itself to a flap of any thickness, and nuts 21 are threaded on said stems to control said forward motion, said standard 20 being supported in the bracket 23 on the base of the sealer frame.

Figures 3, 9, 10:
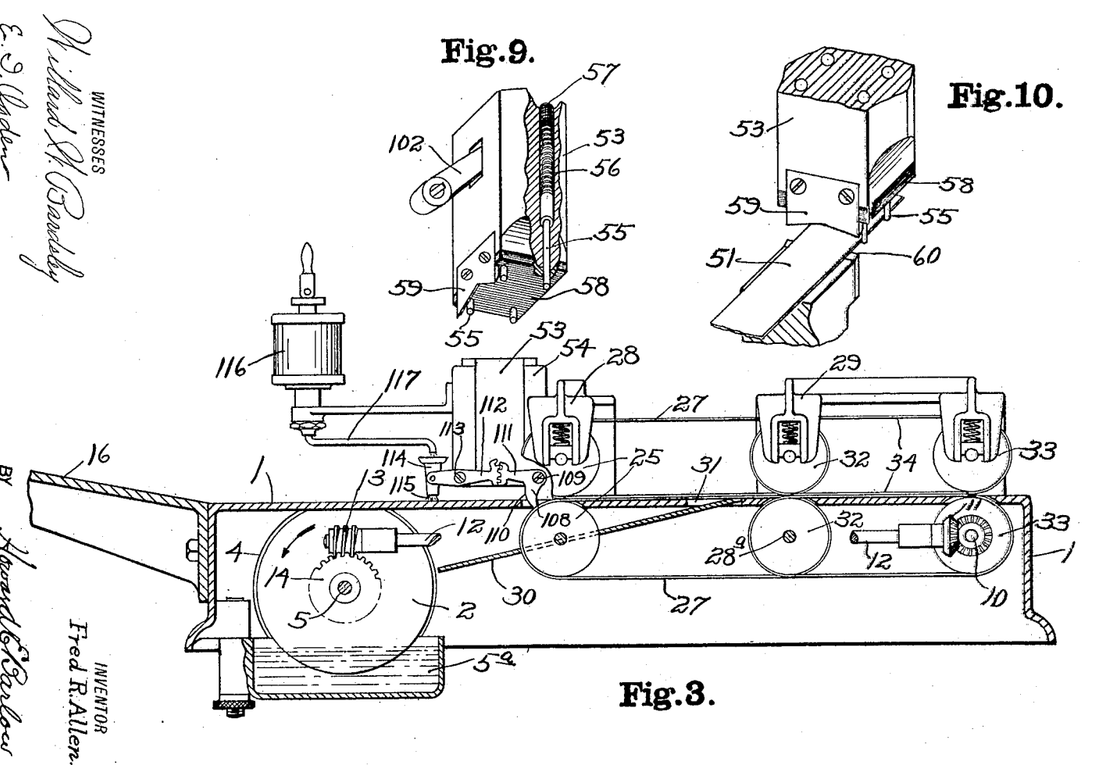
Fig. 3 is a side elevation of the sealing mechanism showing the sealing frame in section.
Fig. 9 is a perspective view, partly in section, of the stamp applying plunger, looking toward the underside, to better show the stamp retaining pins.
Fig. 10 is a perspective view illustrating the ribbon of stamps, the cutters, and the relative location of the plunger.
Figure 6:
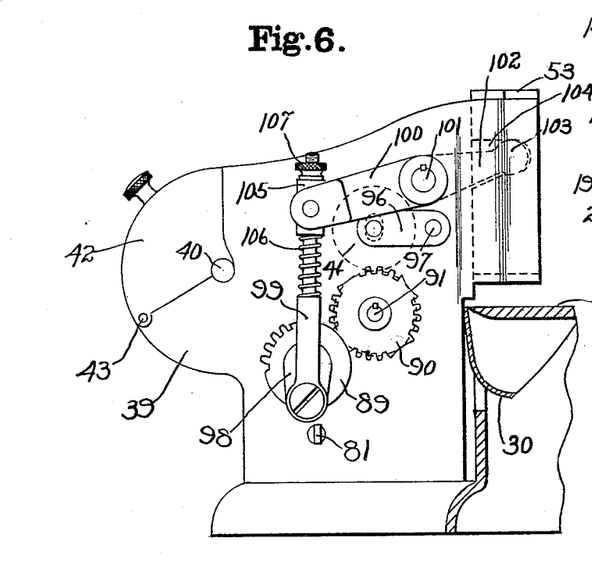
Fig. 6 is a side elevation of the stamping frame taken from the front of the machine, showing the intermittent driving motion and plunger operating connections.

After the gummed portion of the flap has been sufficiently moistened the envelop is engaged by the conveyer bands 27 mounted on a pair of rolls 25 and 26, the upper set of rolls being yieldingly mounted in spring pressed bearings in the supporting brackets 28 and 29 respectively, said rolls receiving their motion from side shaft 12 through miter gears 27$^a$ (see Fig. 1), one of said gears being carried by a shaft 28$^a$, see Fig. 3. The continued forward movement of the envelop by these conveying rolls and bands causes the flap to come in contact with the inclined surface of the closing flap guide 30, see Figs. 3 and 6, which guide is made to gradually close the flap against the body of the envelop as the edge of said flap passes out through the aperture 31 in the face of the sealer frame, after which the envelop advances between the sealing rolls 32 and 33 over which run the conveying belts 34, these rolls being driven from shaft 10 in which the lower roll is mounted.

Figures 1, 2:
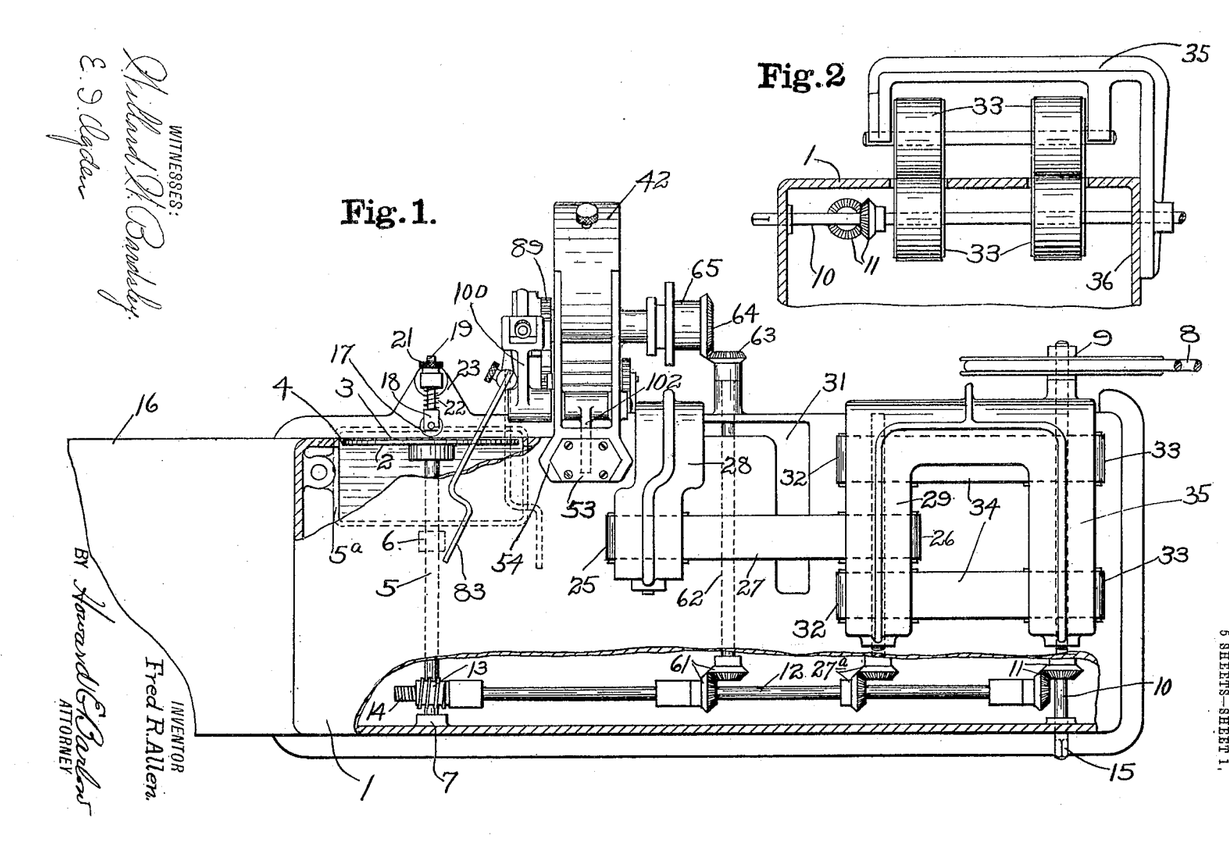
Figure 1 is a plan view of my improved machine.
Fig. 2 is a rear end elevation of the machine showing the open side construction, and a portion of the sealer frame in section.

It will be noted that the bracket arms 28, 29 and 35, see Fig. 1, are each supported only from the back side 36 of the sealer frame in the manner illustrated in Fig. 2, providing an open side construction to permit envelops or mail matter of any width to be passed through and operated upon by the machine.

Figure 7:
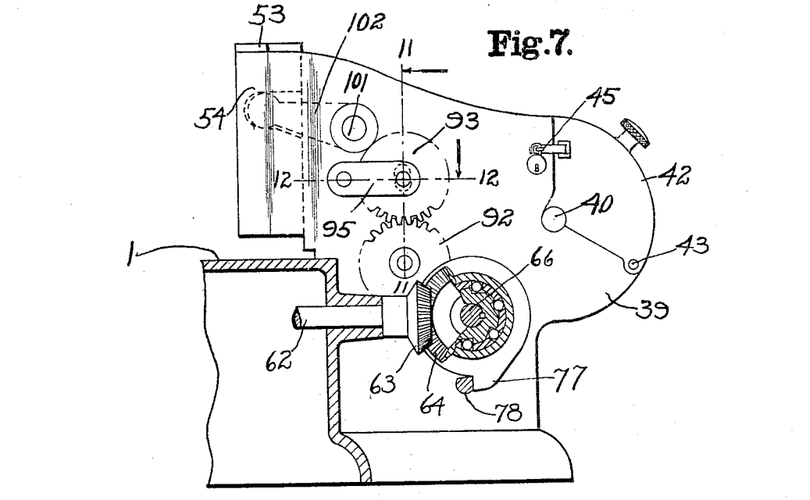
Fig. 7 is a side elevation of the stamping frame taken from the rear of the machine, showing the driving clutch in section and the relative position of the clutch release pin.
Figure 8:
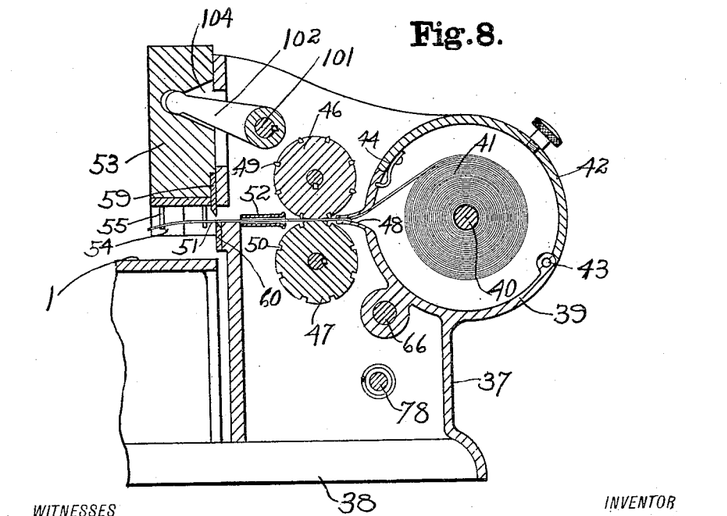
Fig. 8 is a central sectional side elevation through the stamp applying mechanism.

The stamp applying mechanism may be permanently attached to and arranged to work in conjunction with the sealing apparatus, the lower portion of the stamp casing 37 being set on a projecting portion 38 of the sealer frame. This casing is provided with a tight magazine 39, see Fig. 8, in which is mounted on the pin 40 a roll of stamps 41 in which form they are furnished by the Government when desired. This magazine is provided with a cover 42 hinged at 43 and provided with a spring catch 44, the same being adapted to be locked as at 45, see Fig. 7, by any desired means so as to prevent the stamps from being surreptitiously taken therefrom.

Figures 11, 12, 17:
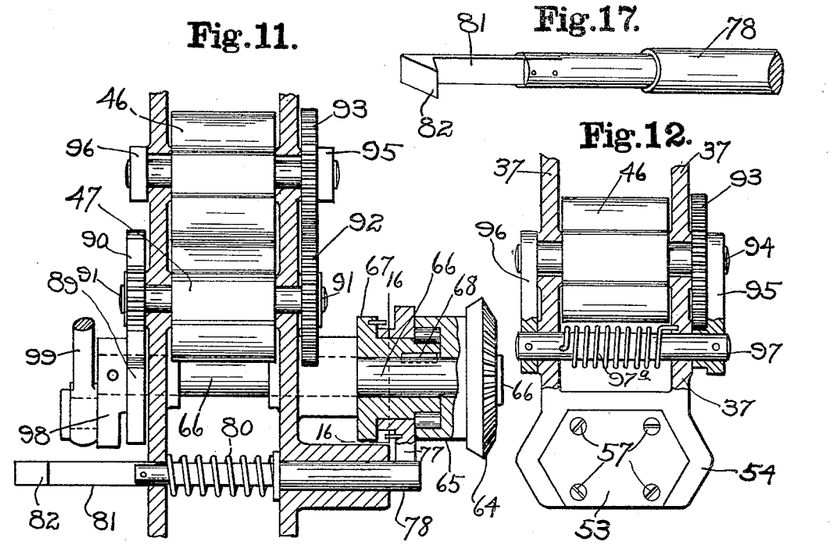
Fig. 11 is a sectional end elevation through the stamping mechanism, on line 11—11 of Fig. 7, looking in the direction of the arrow.
Fig. 12 is a sectional plan view showing a portion of the stamp casing on line 12—12 of Fig. 7.
Fig. 17 is an enlarged detail in perspective of the release pin showing the flexible latch tongue in one end thereof.
Figures 13, 16:
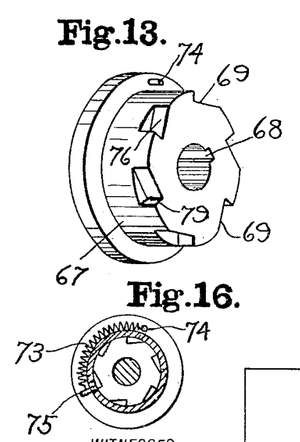
Fig. 13 is a perspective view of the driving toothed clamping hub member of the clutch.
Fig. 16 is an end view of the hub member showing a section through the collar portion of the cage member on line 16—16 of Fig. 11, said view being for the purpose of illustrating the action of the clutch setting spring on said cage member.
Figure 14:
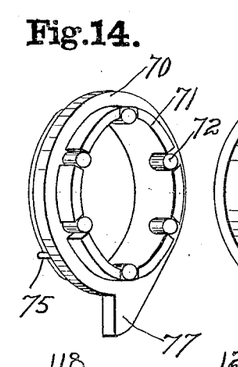
Fig. 14 is a perspective view of the clutch roll cage member and its engaging finger.
Figure 15:
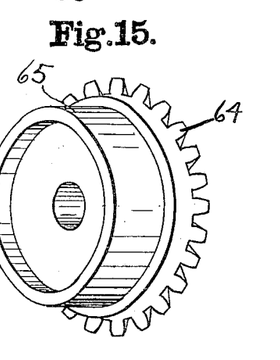
Fig. 15 is a perspective view of the cup member of the clutch which is attached to the power transmitting gear.
Figure 18:
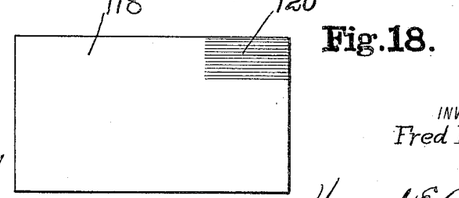
Fig. 18 is a detail of an envelop showing the stamp receiving moistened portion shaded.

A pair of feed rolls 46 and 47 are arranged to receive the ribbon of stamps through a narrow slot 48 in the magazine and push the same out intermittently under the stamp applying plunger hereinafter described. The roll 46 is provided with spaced apart transverse ribs 49 adapted to fit into corresponding recesses 50 in the opposite roll whereby the pressure of these ribs upon the ribbon of stamps has a tendency to give the same a reverse curl with the effect of breaking up the gum, creasing the stamp across its face and straightening out the same so that when the stamp is cut it will lay flat upon the envelop rendering it much more easily affixed thereto. From the roll the ribbon 51 then passes through the guide 52 under the plunger 53. This plunger is arranged to slide vertically in a guide frame 54, (Figs. 7 and 12) and is provided with four pins 55 which extend up through the same and are pressed downward by springs 56, see Fig. 9, the upper ends of said springs being retained by screws 57, these pins being for the purpose of receiving the stamp between them and after the same is cut prevent it from becoming displaced while being transferred to the moistened portion of the envelop.

A plate 58 of rubber, felt or other flexible material, is preferably secured to the base of the plunger to exert a yielding pressure while affixing the stamp.

One blade of a cutter knife 59 is secured to the back face of the plunger. This knife preferably has a fish-tailed edge which is found in practice to operate to the best advantage for this purpose. The lower blade 60 is preferably secured to the frame.

In order to operate the stamp feeding and applying mechanism in a positive manner and also intermittently as the envelops are positioned one after another in the machine, I have arranged a roller clutch, see Figs. 11, 13, 14, 15 and 16, which clutch is driven from the shaft 12 see Fig. 1 through miter gears 61, shaft 62, pinion 63, and large gear 64, which latter is connected to the cup member 65 of said clutch which is mounted loosely on the clutch shaft 66. A hub member 67 is keyed at 68 to said clutch shaft 66, one end of the barrel portion of said hub being provided with a plurality of inclined notches 69, over which portion fits the roll cage member 70 to rotate freely thereon; one edge of this cage member is provided with a slotted flange 71 in each of which slots is loosely set a short roll 72 respectively, which slots and rolls register with said notches in the hub member. The cup member 65 then fits over the outside of the rolls and the notched portion of the cage member in the manner illustrated in Fig. 11. A spring 73, (see Fig. 16), is attached at one end to pin 74 on the hub member and to pin 75 on the cage member and has a tendency to keep the rolls forward or in their locked position forced against the inner surface of the cup member 65 by the inclined surface 76 of the notches in the hub. In order that this clutch may be readily disconnected the cage member 70 is provided with a downwardly extending finger 77 which is adapted to engage one end of a release pin 78 whereby when said finger, during its revolution, engages said release pin the rolls are carried back against the squared shoulders 79 of the hub member, withdrawing the rolls from contact with the inner face of the cup member, and allowing said cup member to turn freely without driving the shaft 66.

Figure 4:
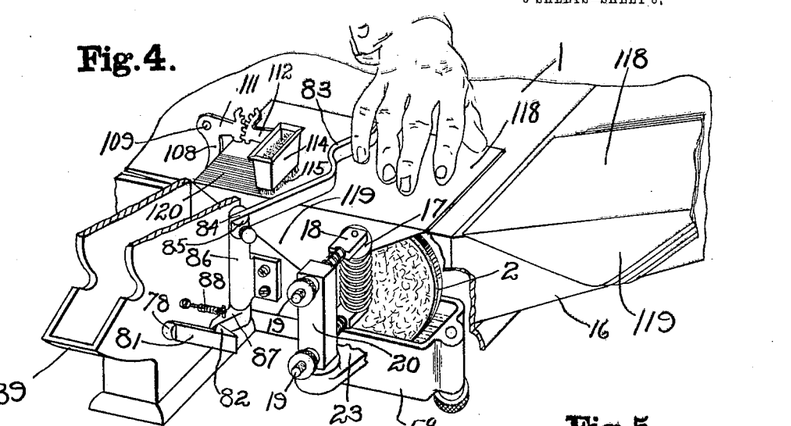
Fig. 4 is a perspective view showing the arrangement of mechanism and manner of feeding the envelops to the machine.

This release pin 78 is mounted to slide endwise in the stamping frame being under tension of the coil spring 80 to return it to its normal position, the same being provided at its opposite end with a spring latch tongue 81 having a hook 82 formed at its outer end whereby it may be engaged and withdrawn by the hand operated trip lever 83, see Fig. 4, when the envelop has been positioned to receive the stamp.

This lever 83 is pivoted at 84 in the upper end of the upright spindle 85, which spindle is held to rotate in the bearing 86. A dog 87 is attached to the lower end of said spindle and adapted to engage the hooked notch 82 in the spring tongue 81. In the moving of this actuating lever 83 to its extreme forward position the dog 87 withdraws the release pin 78 allowing the clutch to immediately move into engagement and start to rotate, and as said dog swings on the arc of a circle it is naturally withdrawn from the hook end 82 of the spring latch, (after said pin has released said clutch), thereby allowing said pin, under tension of spring 80, to automatically return to its normal position and wait to be engaged by the finger 77 upon its next revolution, then as the actuating lever 83 is returned to its normal position by the spring 88 the dog rides back on the inclined surface of the yielding latch and snaps back of the hook portion 82 ready to again be operated by the next forward movement of the actuating lever.

When it is desired to operate the sealing mechanism without operating the stamper the actuating lever 83 is turned up out of the way on its hinge or pivoted end 84.

The stamp setting rolls 46—47 in this case have a circumference four times the length of the stamp, so that it is necessary to rotate these rolls but one-quarter of a revolution each time a stamp is fed forward. In order to accomplish this in a positive manner I have provided a set of intermittent four to one actuating gears 89 and 90, (see Fig. 6) mounting one on the clutch shaft 66 and the other on the lower roll shaft 91, the upper roll being driven from the lower roll by gears 92 and 93, see Figs. 7 and 11. In order to cause a suitable tension of the upper roll upon the lower roll I have mounted the upper roll on a shaft 94, see Fig. 12, which shaft is in turn journaled in swinging bearing links 95 and 96 (Figs. 6 and 7), the same being adapted to move slightly up and down in slots in the stamp frame 37. The opposite ends of these links are mounted on and fixed to the pin 97 journaled in the frame 37 around which pin is wound the tension spring 97ª for the purpose of exerting a pressure of the upper roll upon the lower.

The stamp affixing plunger 53 is arranged to reciprocate at the proper time to force the stamp down firmly onto the envelop by means of the crank 98 (Fig. 6), connecting rod 99, arm 100, which is keyed to the shaft 101, and the arm 102, one end of which is also keyed to said shaft 101, the opposite end 103 being adapted to engage the walls of a slot 104 in the back of said plunger whereby the rotation of said crank causes said plunger to reciprocate. In order to control and vary the length of the downward stroke of the stamp applying plunger the arm 100 is pivoted on a loose collar 105 through which the connecting rod 99 extends. A spring 106 is arranged to exert the proper tension on the plunger through the operating arms above described, and the nut 107 is threaded on the outer end of said connection whereby the lower limit of the stroke of the plunger may be varied. In other words, by this spring and the adjusting nut I can control the amount and also the duration of the pressure of the plunger on the envelop while applying the stamp thereto.

In order to position the envelop to receive the stamp, the same is fed against a little stop finger 108, see Figs. 3 and 4, pivoted at 109 and extending off on its engaging face at 110. This stop finger is provided with a forwardly extending arm 111, the end of which arm is provided with teeth meshing with those of a lever 112, said lever being pivoted at 113, its opposite end being connected to the moistening brush casing 114, which latter is provided with a brush 115, made of hair, felt, or other suitable material at its lower end. The width of the brush is practically the width of the stamp and is adapted to engage the surface of the envelop to moisten it as the same is fed forward to receive the gummed surface of the stamp. Moisture is applied to this brush from the ordinary water drip cup 116 through the pipe 117. The connection between the stop finger and the brush is arranged so that said brush will be raised from the surface of the envelop (after the stamp has been affixed thereto,) by another forward movement of said envelop, which movement raises the finger and allows the envelop to pass beneath it on its way through the machine, the end of said finger dragging along the surface of the envelop and again dropping down into position, at the same time returning the brush to its engaging position after the envelop has passed, to again form a stop for, and also to moisten the face of the next succeeding envelop.

The operation of my improved stamp applying and envelop sealing machine may be more fully described as follows: The envelops 118 are placed in a pile on the forwardly extending shelf 16, which shelf is on a slight incline to the surface of the sealing frame to facilitate the feeding forward of said envelops. The flap of each envelop is open and extends down over the back edge of the frame. The hand of the operator rests lightly on the top envelop and carries the same forward with a quick motion, the gummed surface of the flap 119 passing across the face of the moistening disk against which it is pressed with the proper tension by the presser roll 17. At the same time the stamp receiving surface 120 on the upper right hand corner of the envelop is moistened by contact with the brush 115 and the envelop is advanced until its forward edge brings up against the stop finger 108. The trip or actuating lever 83 is now pressed laterally by the little finger of the operating hand which is bearing on the envelop to advance it which motion of the lever actuates the stamping mechanism to apply the stamp with a quick and positive action, and a further motion of the hand carries the envelop forward, raising the stop finger and the moistener and delivers the envelop to the sealing rolls and conveying belts. The flap which is turned under and closed during this forward motion, is pressed together and sealed by the sealing rolls.

A convenient feature of the stamp feeding mechanism is that the stamp applying plunger is used as a gage for determining whether or not the stamps are feeding correctly. In order to accomplish this the width of the plunger is made exactly the length of the stamp so that should the edge of the next stamp in feeding extend too far or not far enough it would be quickly observed by the operator and the proper adjustment made. The function is further insured by the fact that the guides 54 project downward so that the stamp is fed between them, and the front edges of the guides are flush with the front face of the plunger (see Figs. 7, 8 and 12.)

In some cases where stamped envelops are used, or in government offices where no stamps are used, the machine may be operated as a sealing machine only by simply raising the trip lever 83 out of the path of movement of the hand that feeds the envelops. Then again, open mail matter, post cards, or the like, may be stamped without sealing by simply withdrawing the moistening attachment or by sending the envelop through with the flaps closed.

It will be noted that the frame of the machine is open on one side so as to permit the passage of mail matter of any size therethrough, the presser roll against the moistening disk being flexibly held so as to accommodate itself to envelop flaps of different thicknesses and the stamp applying plunger is also arranged so that it may be readily adjusted to accommodate itself to mail matter of different thicknesses.

Another important feature of my improved construction is that the stamp feeding rolls are positively fed by a gear driven motion so that it will be impossible for the length of but a single stamp to be fed into position upon each actuation of the stamp applying mechanism.

My invention is very simple in construction, practical and effective in its operation, and by its use envelops may be fed rapidly through the machine to be sealed and stamped.

This invention is not restricted to the precise construction and arrangement of parts herein shown and described as any machine of this character to which the envelops are fed by hand, and where the stamp applying mechanism is manually actuated or set in motion upon the positioning of the envelop, will fall within the spirit and scope of my invention, one practical embodiment of which has been herein illustrated and described without attempting to show all of the various forms and modifications in which my invention might be embodied.

Having thus described my invention, what I claim as new and desire to secure by Letters Patent, is:

1. In a machine of the class described the combination with envelop moistening and sealing mechanism, a stamp carrier, mechanism for applying the stamp to the envelop, means whereby said envelop may be positioned under the stamper, and a lever extending out over the path of the movement of the envelop and into the path of movement of a hand advancing the envelop whereby said mechanism may be manually controlled when the envelop is positioned to receive the stamp.

2. In a machine of the class described the combination with envelop moistening and sealing mechanism, a stamp carrier, mechanism for applying the stamp to the envelop, a stop finger in the path of the advancing envelop for positioning the same beneath said applying mechanism, and means located in the path of movement of a hand advancing the envelop whereby said mechanism may be manually controlled when the envelop is positioned to receive the stamp.

3. In a machine of the class described the combination with envelop moistening and sealing mechanism, a stamp carrier, mechanism for applying the stamp to the envelop, means in the path of the advancing envelops for positioning the same under said applying mechanism, and means located in the path of movement of a hand advancing the envelop whereby said mechanism may be readily controlled by the hand that feeds the envelop when said envelop is in position to receive the stamp.

4. In a machine of the class described the combination with envelop moistening and sealing mechanism, a stamp carrier, mechanism for applying the stamp to the envelop, means whereby said envelop may be positioned under said applying mechanism, and a lever extending into the path of movement of the hand that feeds the envelop whereby said applying mechanism may be actuated when the envelop is in position to receive the stamp.

5. In a machine of the class described the combination with envelop moistening and sealing mechanism, a stamp carrier, mechanism for applying the stamp to the envelop, a stop finger in the path of the advancing envelop for positioning the same beneath said applying mechanism, and a lever extending into the path of movement of the hand that feeds the envelop whereby said applying mechanism may be actuated when the envelop is in position to receive the stamp.

6. In a machine of the class described the combination with envelop flap moistening and sealing mechanism, a stamp carrier, mechanism for applying the stamp to the envelop, means for moistening the stamp receiving portion of the envelop, a stop finger in the path of the advancing envelop for positioning the same beneath said applying mechanism, means whereby said mechanism may be manually actuated to affix the stamp, and means whereby said moistening means may be raised clear of the envelop by the next advancing motion of said envelop after the stamp has been applied thereto.

7. In a machine of the class described the combination with envelop flap moistening and sealing mechanism, a stamp carrier, mechanism for applying the stamp to the envelop, means for moistening the stamp receiving portion of the envelop, a positioning stop finger pivotally held in the path of the advancing envelop, means for operatively connecting said finger with said moistener, means whereby said mechanism may be manually actuated to apply the stamp, said finger being adapted to be raised and to also raise said moistening means clear of the envelop by the next advancing motion of said envelop after the stamp has been applied thereto.

8. In a machine of the class described the combination with envelop flap moistening and sealing mechanism, a stamp carrier, mechanism for applying the stamp to the envelop, means for moistening the stamp receiving portion of the envelop, a positioning stop finger pivotally held in the path of the advancing envelop, means for operatively connecting said finger with said moistener, means whereby said mechanism may be manually actuated to apply the stamp, said finger being adapted to be raised and to also raise moistening means clear of the envelop by the next advancing motion of said envelop after the stamp has been applied thereto, both said finger and said moistener being adapted to automatically return to their operating position to engage the next succeeding envelop.

9. In a machine of the class described the combination with envelop moistening and sealing mechanism, a stamp magazine for carrying a roll of stamps in ribbon form, means for positively feeding said ribbon of stamps and positively actuated means for applying the stamp to the envelop, and means adapted to be manually actuated for controlling the operation of the stamp affixing mechanism when the envelop is positioned to receive the stamp.

10. In a machine of the class described, the combination with envelop moistening and sealing mechanism, a stamp magazine, means in said magazine for carrying a roll of stamps in ribbon form, a pair of rolls for positively feeding said stamp ribbon to the envelop, intermittent gears through which said rolls receive their motion, a stamp applying plunger, and means adapted to be manually actuated for controlling the operation of said stamping mechanism.

11. In a machine of the class described, the combination with envelop moistening and sealing mechanism, a stamp magazine for carrying a roll of stamps in ribbon form, a pair of spring pressed rolls for feeding said stamp ribbon to the envelop, means on said rolls for correcting the curvature of the ribbon, intermittent gears through which said rolls receive their motion, a stamp applying plunger provided with a cutter knife, a driving clutch, and manually actuated means for controlling the operation of said stamping mechanism.

12. In a machine of the class described the combination with envelop moistening and sealing mechanism, a stamp magazine for carrying a roll of stamps in ribbon form, positively actuated rolls for feeding the stamp to the envelop, a stamp applying plunger, means coöperating with said rolls for reciprocating said plunger, a cutter for severing each stamp from its ribbon, and a plurality of spring pressed pins projecting below the face of the plunger for preventing the displacement of the stamp while being carried to the envelop after having been severed, said pins being located to receive a stamp between them.

13. In a machine of the class described the combination with envelop moistening and sealing mechanism, a stamp magazine for carrying a roll of stamps in ribbon form, positively actuated rolls for feeding the stamp to the envelop, a stamp applying plunger, means coöperating with said rolls for reciprocating said plunger, means for causing said plunger to apply the stamp with a yielding pressure, and means for varying the lower limit of the plunger stroke.

14. In an envelop sealing and stamping machine, the combination of the envelop moistening and sealing mechanism with stamp feeding and applying mechanism, a clutch through which said latter mechanism is driven, a release pin controlling the action of said clutch, and manually actuated means extending into the path of movement of a hand advancing the envelop for withdrawing said pin to cause said latter mechanism through said clutch to apply the stamp when the envelop is positioned.

15. In an envelop sealing and stamping machine, the combination of the envelop moistening and sealing mechanism with stamp feeding and applying mechanism, a clutch through which said latter mechanism is driven, a release pin controlling the action of said clutch, manually actuated means extending into the path of movement of a hand advancing the envelop for withdrawing said pin to cause said latter mechanism through said clutch to apply the stamp when the envelop is positioned, and means whereby said release pin is itself released by said actuating means after said pin has released said clutch.

16. In an envelop sealing and stamping machine, the combination of the envelop moistening and sealing mechanism with stamp feeding and applying mechanism, a clutch through which said latter mechanism is driven, a release pin controlling the action of said clutch, a spring latch on said pin, a dog for engaging said latch, a lever whereby said dog may be actuated to withdraw said pin to release said clutch and cause the feeding and applying mechanism to affix the stamp when the envelop is positioned, and means whereby said dog is caused to release said pin after the latter has released said clutch.

17. In an envelop sealing and stamping machine, the combination of the envelop moistening and sealing mechanism with stamp feeding and applying mechanism, a clutch through which said latter mechanism is driven, a release pin controlling the action of said clutch, and a lever extending into the path of movement of the hand while feeding the envelop, for withdrawing said pin to cause said latter mechanism through said clutch to apply the stamp as the envelop is positioned.

18. In an envelop sealing and stamping machine, the combination of the envelop moistening and sealing mechanism with stamp feeding and applying mechanism, a clutch through which said latter mechanism is driven, a release pin controlling the action of said clutch, a spring latch on said pin, and manually operated means for engaging said latch to withdraw said pin and cause said feeding and applying mechanism through said clutch to apply the stamp when the envelop is positioned.

19. In an envelop sealing and stamping machine, the combination of a frame for supporting the envelops to be fed to the machine, flap moistening means, means for halting the envelop as it is being advanced by hand, hand actuated stamp applying mechanism for affixing the stamp while the envelop rests, and sealing rolls to subsequently engage and deliver the envelop from the machine, all of the parts being relatively positioned to perform their operations while the envelop is advanced in a direct path.

20. In an envelop sealing and stamping machine, the combination of a frame for supporting the envelops to be fed to the machine, flap moistening means, means for halting the envelop as it is being advanced by hand, a hand operated lever for actuating a stamp applying mechanism to affix a stamp while the envelop rests, and sealing rolls to subsequently engage and deliver the envelop from the machine, all of the parts being relatively positioned to perform their operations while the envelop is advanced in a direct path.

21. In an envelop sealing and stamping machine, the combination of a frame for supporting the envelops to be fed to the machine, a flap moistening means, means for halting the envelop as it is being advanced by hand, a hand operated lever for actuating a stamp applying mechanism to affix a stamp while the envelop rests, means whereby said lever may be readily withdrawn from the path of movement of the envelop feeding hand, and sealing rolls to subsequently engage and deliver the envelop from the machine.

22. In a machine of the class described, the combination with envelop moistening and sealing mechanism, a stamp magazine, a roll of stamps in ribbon form in said magazine, a pair of positively and intermittently driven stamp ribbon feed rolls, a stamp applying plunger, guides for the plunger the outer edges of the guides and the face of said plunger being arranged to serve as a gage to indicate the correct position of the stamp to be affixed.

In testimony whereof I affix my signature in presence of two witnesses.

FRED R. ALLEN.

Witnesses:
HOWARD E. BARLOW,
E. I. OGDEN.

---

Copies of this patent may be obtained for five cents each, by addressing the "Commissioner of Patents, Washington, D. C."